US010580395B2

(12) United States Patent
Akasaka et al.

(10) Patent No.: US 10,580,395 B2
(45) Date of Patent: Mar. 3, 2020

(54) SOUND ABSORBING BODY

(71) Applicant: COMPAGNIE GENERALE DES ETABLISSEMENTS MICHELIN, Clermont-Ferrand (FR)

(72) Inventors: Shuichi Akasaka, Tokyo (JP); Hidetoshi Matsumoto, Tokyo (JP); Takahisa Kato, Tsukuba (JP)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 232 days.

(21) Appl. No.: 15/515,765

(22) PCT Filed: Sep. 30, 2015

(86) PCT No.: PCT/JP2015/077771
§ 371 (c)(1),
(2) Date: Mar. 30, 2017

(87) PCT Pub. No.: WO2016/052637
PCT Pub. Date: Apr. 7, 2016

(65) Prior Publication Data
US 2017/0309266 A1 Oct. 26, 2017

(30) Foreign Application Priority Data
Sep. 30, 2014 (WO) .................. PCT/JP2014/076159

(51) Int. Cl.
| *G10K 11/162* | (2006.01) |
| *B29C 48/05* | (2019.01) |
| *B29C 48/00* | (2019.01) |
| *B29C 48/14* | (2019.01) |
| *G10K 11/16* | (2006.01) |
| *D01D 5/00* | (2006.01) |
| *D01D 7/00* | (2006.01) |
| *D04H 1/43* | (2012.01) |
| *D04H 1/4334* | (2012.01) |
| *D04H 1/435* | (2012.01) |
| *D04H 1/4358* | (2012.01) |
| *B29K 33/20* | (2006.01) |

(52) U.S. Cl.
CPC ........ *G10K 11/162* (2013.01); *B29C 48/0021* (2019.02); *B29C 48/05* (2019.02); *B29C 48/142* (2019.02); *D01D 5/0007* (2013.01); *D01D 7/00* (2013.01); *D04H 1/43* (2013.01); *D04H 1/435* (2013.01); *D04H 1/4334* (2013.01); *D04H 1/4358* (2013.01); *G10K 11/16* (2013.01); *B29K 2033/20* (2013.01); *B29K 2995/0001* (2013.01)

(58) Field of Classification Search
CPC .............. G10K 11/162; B29C 47/0014; B29C 47/0064; B29C 47/0076; B29C 47/0007; D01D 5/00; D01D 5/0007

USPC ........................................................ 181/286
See application file for complete search history.

(56) References Cited

U.S. PATENT DOCUMENTS

| 4,946,899 | A | 8/1990 | Kennedy et al. ............. 525/244 |
| 6,983,822 | B2 * | 1/2006 | O'Regan .................. B32B 5/18 |
| | | | 181/290 |
| 7,971,683 | B2 * | 7/2011 | Bayle ...................... B60R 13/02 |
| | | | 181/204 |
| 8,727,071 | B2 * | 5/2014 | Berker ...................... B32B 5/18 |
| | | | 181/286 |
| 8,863,897 | B2 * | 10/2014 | Bertolini ............. G10K 11/002 |
| | | | 181/204 |
| 8,875,838 | B1 * | 11/2014 | Yano ...................... G10K 11/16 |
| | | | 181/207 |
| 8,950,548 | B2 * | 2/2015 | Schneider ........... B60R 13/0815 |
| | | | 181/292 |
| 2007/0100060 | A1 | 5/2007 | Tahri et al. |
| 2007/0151800 | A1 | 7/2007 | Olson et al. |
| 2014/0030491 | A1 | 1/2014 | Sakai et al. |

FOREIGN PATENT DOCUMENTS

| JP | 2008-89620 A | 4/2008 |
| JP | 2010-248666 A | 11/2010 |
| JP | 2013-134427 A | 7/2013 |
| JP | 2013-181381 A | 9/2013 |
| JP | 2013181381 A * | 9/2013 |

OTHER PUBLICATIONS

Zs. Fodor, et al., "Polyisobutylene-containing block polymers by sequential monomer addition", Polymer Bulletin 29, 697-704 (1992).
J.E. Puskas, et al., "Polyisobutylene-Containing Block Polymers by Sequential Monomer Addition", J. Polymer Science: Part A: Polymer Chemistry, vol. 30, 41-48 (1992).
J.P. Kennedy, et al., "Polyisobutylene-Containing Block Copolymers by Sequential Monomer Addition", Macromolecules 1991, 24, 6572-6577.

(Continued)

*Primary Examiner* — Forrest M Phillips
(74) *Attorney, Agent, or Firm* — Venable LLP

(57) ABSTRACT

A sound absorbing body comprises a non-woven fabric or a non-woven fabric laminate, the non-woven fabric or the non-woven fabric laminate comprises a fiber that has an average fiber diameter of less than 3,000 nm, the non-woven fabric or the non-woven fabric laminate has a thickness of less than 10 mm, the non-woven fabric or the non-woven fabric laminate has a unit thickness flow resistance of greater than 4.0 E+06 Ns/m$^4$ and less than 5.0 E+08 Ns/m$^4$, and the non-woven fabric or the non-woven fabric laminate has a bulk density of greater than 70 kg/m$^3$ and less than 750 kg/m$^3$.

10 Claims, No Drawings

(56) References Cited

OTHER PUBLICATIONS

G. Kaszas, et al., "New Thermoplastic Elastomers of Rubbery Polyisobutylene and Glassy Cyclopolyisoprene Segments", Applied Polymer Science 39(1), 119-144 (1990).
J.E. Puskas, et al., "Transparent Flexible UV-Cured Films from Polyisobutylene-Polyisoprene Block Polymers", J. Macromolecular Science, Chemistry A28, 65-80 (1991).

* cited by examiner

SOUND ABSORBING BODY

TECHNICAL FIELD

The present invention relates to a sound absorbing body able to be advantageously used in construction materials (for homes, factories and acoustic facilities, for example), motor vehicles, tires, electrical products, and the like.

BACKGROUND ART

Noise causes people psychological discomfort, can be a source of irritation and stress, and can cause conditions such as headaches and hearing loss. As a result, a variety of countermeasures have been proposed. Countermeasures proposed in the past have exhibited a limited effect in terms of reducing the level of noise that encompasses all frequency regions, but these tackled noise by reducing sounds mainly in the middle frequency region and high frequency region.

Non-woven fabrics are fabrics produced by irregularly aligning or entangling natural or synthetic fibers through the use of adhesive agents, heating and pressing or sewing, and are highly porous materials having connected voids. If porous sound absorbing materials are thin, absorption of sound in the low frequency region is generally difficult. In the past, materials having a mass per unit area of 0.1-20 $g/m^2$ (see Patent Document 1) and materials requiring a thickness of 0.5 mm or more (see Patent Document 2) have been reported as sound absorbing materials.

PRIOR ART DOCUMENTS

Patent Documents

[Patent Document 1] Japanese Patent Application Publication No. 2010-248666
[Patent Document 2] Japanese Patent Application Publication No. 2008-89620

SUMMARY OF THE INVENTION

Problem to be Solved by the Invention

The present invention addresses the problem of providing a sound absorbing body which is thin and which exhibits a high sound absorption rate.

Means for Solving the Problem

The present invention provides the following sound absorbing body:
1. A sound absorbing body comprising a non-woven fabric or a non-woven fabric laminate,
wherein the non-woven fabric or the non-woven fabric laminate comprises a fiber that has an average fiber diameter of less than 3,000 nm,
the non-woven fabric or the non-woven fabric laminate has a thickness of less than 10 mm,
the non-woven fabric or the non-woven fabric laminate has a unit thickness flow resistance of greater than 4.0 E+06 $Ns/m^4$ and less than 5.0 E+08 $Ns/m^4$, and
the non-woven fabric or the non-woven fabric laminate has a bulk density of greater than 70 $kg/m^3$ and less than 750 $kg/m^3$.
2. The sound absorbing body according to 1 above, wherein the non-woven fabric or the non-woven fabric laminate comprises the fiber that is a fiber formed from a synthetic resin and/or an elastomer.
3. The sound absorbing body according to 2 above, wherein the synthetic resin is a thermoplastic resin.
4. The sound absorbing body according to 3 above, wherein the thermoplastic resin is selected from the group consisting of polyethylene, polypropylene, polyacrylonitrile, poly(vinylidene fluoride), polysulfone, polyether sulfone, polyether ketone, polyether ether ketone, polyamide, polyester, polycarbonate, polyether imide, poly(arylene oxide), thermoplastic polyimide, polyamideimide, poly(butylene terephthalate), poly(ethylene terephthalate), polyethylene, acrylonitrile-butadiene-styrene and polyurethane resins.
5. The sound absorbing body according to any one of 2 to 4 above, wherein the elastomer is a thermoplastic elastomer.
6. The sound absorbing body according to 5 above, wherein the thermoplastic elastomer is a thermoplastic styrene (TPS) elastomer.
7. The sound absorbing body according to 6 above, wherein the thermoplastic styrene elastomer is block copolymer(s) selected from the group consisting of styrene/butadiene/styrene (SBS), styrene/butadiene/butylene/styrene (SBBS), styrene/isoprene/styrene (SIS), styrene/butadiene/isoprene/styrene (SBIS), styrene/ethylene/butylene/styrene (SEBS) and the mixtures thereof.
8. The sound absorbing body according to 6 or 7 above, wherein the thermoplastic styrene elastomer is a styrene/ethylene/butylene/styrene (SEBS) copolymer.
9. The sound absorbing body according to any one of 1 to 8 above, wherein the porosity of the non-woven fabric or the non-woven fabric laminate is lower than 0.92.
10. The sound absorbing body according to any one of 1 to 9 above, wherein the sound absorbing body exhibits a peak of sound absorption of lower than 3,000 Hz.
11. The sound absorbing body according to any one of 1 to 10 above, wherein the sound absorbing body exhibits a normal incident sound absorption coefficient of 0.2 or higher.

Advantageous Effect of Invention

According to the present invention, it is possible to provide a thin sound absorbing body that exhibits a sufficient sound absorption effect in a broad frequency range from the low frequency region to the high frequency region, and especially in the low frequency region. The sound absorbing body of the present invention, which can be accommodated in construction materials (for homes, factories and acoustic facilities, for example), motor vehicles, tires, electrical products, and the like, can effectively absorb sound waves.

MODE FOR CARRYING OUT THE INVENTION

In this explanation, percentages (%) always mean mass percentages, unless explicitly indicated otherwise.

Furthermore, within the scope of the meaning of the present patent application, the term "phr" means parts by mass per 100 parts of a blended thermoplastic or non-thermoplastic elastomer.

Furthermore, a numerical range indicated by the expression "between a and b" means a numerical range that is greater than a and lower than b (that is, excludes the end points a and b), but a numerical interval indicated by the expression "a-b" means a numerical range that extends from a to b (that is, includes the exact end points a and b).

In addition, in cases where the term "non-woven fabric" is mentioned in the present specification, this means a single non-woven fabric that has not been laminated.

1. Non-Woven Fabric Raw Material

The raw material for the non-woven fabric in the present invention is not particularly limited, but is preferably a synthetic resin and/or an elastomer. The synthetic resin and/or elastomer are not particularly limited as long as a non-woven fabric can be formed therefrom.

A thermoplastic resin is preferred as the synthetic resin.

1.1. Thermoplastic Resin

Examples of thermoplastic resins include polyethylene, polypropylene, polyacrylonitrile, poly(vinylidene fluoride), polysulfone, polyether sulfone, polyether ketone, polyether ether ketone, polyamide, polyester, polycarbonate, polyether imide, poly(arylene oxide), thermoplastic polyimide, polyamideimide, poly(butylene terephthalate), poly(ethylene terephthalate), polyethylene, acrylonitrile-butadiene-styrene and polyurethane resins. It is possible to use one of these thermoplastic resins in isolation, or a combination of 2 or more types thereof. Of these, polyethylene, polypropylene, polyacrylonitrile, poly(vinylidene fluoride) and polyurethane resins are preferred. Polyacrylonitrile and polyurethane resins are particularly preferred.

From the perspective of forming a non-woven fabric, the weight average molecular weight of the thermoplastic resin is preferably 4000-3,000,000 g/mol, and more preferably from 30,000 to 500,000 g/mol. Moreover, the weight average molecular weight can be measured using an already known method, such as gel permeation chromatography (GPC).

A thermoplastic elastomer is preferred as the elastomer.

1.2. Thermoplastic Elastomer (TPE)

A thermoplastic elastomer (abbreviated to "TPE") is a structural intermediate between a thermoplastic polymer and an elastomer. These are block copolymers constituted from rigid thermoplastic resin blocks connected via flexible elastomer blocks.

The thermoplastic elastomer used to carry out the present invention is a block copolymer. The thermoplastic blocks and elastomer blocks may differ from each other in terms of chemical properties.

1.2.1. TPE Structure

The number average molecular weight (expressed as Mn) of the TPE is preferably between 30,000 and 500,000 g/mol, and more preferably between 40,000 and 400,000 g/mol. If the number average molecular weight is lower than the minimum value indicated, the number of molecular chain intertwinement points decreases and cohesive strength decreases, which results in fibers being harder to form and the risk of adverse effects on mechanical properties.

By using gel permeation chromatography (GPC), the number average molecular weight (Mn) of the TPE can be quantitatively determined using an already known method. In the case of a styrene-based thermoplastic elastomer, for example, a sample is first dissolved in tetrahydrofuran at a concentration of approximately 1 g/l, and the obtained solution is filtered using a filter having a pore size of 0.45 μm and then injected. The apparatus used is a Waters Alliance chromatography line. The elution solvent is tetrahydrofuran, the flow rate is 0.7 ml/min, the system temperature is 35° C., and the analysis time is 90 minutes. A set of 4 connected Waters Styragel columns (one HMW7, one HMW6E and two HT6E) are used. The volume of polymer sample solution injected is 100 μl. The detector is a Waters 2410 differential refractive index detector, and the related software for utilizing the chromatography data is the Waters Millennium system. The calculated average molar mass is associated with a calibration curve obtained using a polystyrene standard. Conditions can be adjusted by a person skilled in the art.

The polydispersity index (PI=Mw/Mn, where Mw denotes mass average molecular weight and Mn denotes number average molecular weight) of the TPE is preferably lower than 3, more preferably lower than 2, and further preferably lower than 1.5.

In cases where the glass transition temperature of the TPE is mentioned in the present patent application, this relates to the Tg value associated with the elastomer blocks. The glass transition temperature ("Tg") of the TPE is preferably 25° C. or lower, and more preferably 10° C. or lower.

As is known, TPEs exhibit 2 glass transition temperature peaks (Tg, measured in accordance with ASTM D3418), with the lower temperature peak being associated with the elastomer part of the TPE and the higher temperature peak being associated with the thermoplastic part of the TPE. Therefore, flexible blocks in the TPE are defined as having a Tg value of less than ambient temperature (25° C.), and rigid blocks are defined as having a Tg value of higher than 80° C.

Because the TPE consists essentially of an elastomer part and a thermoplastic part, the TPE must have blocks that are sufficiently incompatible with each other in order to maintain the individual characteristics of the elastomer blocks and the thermoplastic blocks (that is, blocks that differ in terms of mass, polarity and Tg value).

The TPE may be a copolymer having a small number of blocks (fewer than 5, and typically 2 or 3), and in such cases, these blocks preferably have a high mass of greater than 15,000 g/mol. This TPE may be, for example, a diblock copolymer containing a thermoplastic block and an elastomer block. This TPE is often a triblock elastomer having 2 rigid segments connected via a flexible segment. The rigid segments and flexible segment may be positioned in a linear, star-like or branched manner. Typically, these segments or blocks often include a minimum of 5 base units, and generally more than 10 base units (for example, styrene units and butadiene units in a styrene/butadiene/styrene block copolymer).

The TPE may also have a large number of blocks (more than 30, and typically from 50 to 500), and in such cases, it is preferable for these blocks to have a relatively low mass, such as from 500 to 5000 g/mol; and this type of TPE is called a multiblock TPE hereinafter, and is an elastomer block/thermoplastic block series.

According to a first modification, a TPE is supplied in a linear form. For example, the TPE is a diblock copolymer: thermoplastic block/elastomer block. The TPE may also be a triblock copolymer: thermoplastic block/elastomer block/thermoplastic block, that is, a central elastomer block and a terminal thermoplastic block at each end of the elastomer block. Similarly, a multiblock TPE may be a linear elastomer block/thermoplastic block series.

According to another modification of the present invention, a useful TPE required in the present invention is supplied in a star-like branched form having at least 3 branches. For example, in such cases, the TPE may be constituted from a star-like branched elastomer block having at least 3 branches and thermoplastic blocks positioned at the ends of the branches in the elastomer block. The number of branches in the central elastomer may vary, for example, from 3 to 12, and preferably from 3 to 6.

According to another modification of the present invention, a TPE is supplied in a branched or dendrimer-like form. In such cases, the TPE may be constituted from a branched or dendrimer-like elastomer block and thermoplastic blocks positioned at the ends of branches in the dendrimer-like elastomer block.

1.2.2. Elastomer Block Properties

A TPE elastomer block required in the present invention may be any elastomer that is already known by persons skilled in the art. It is preferable for the TPE elastomer block to have a Tg value of lower than 25° C., preferably lower than 10° C., more preferably lower than 0° C., and particularly preferably lower than −10° C. In addition, it is preferable for the TPE elastomer block to have a Tg value of higher than −100° C.

For elastomer blocks having a carbon-based chain, a case in which the elastomer portion of the TPE does not contain an ethylene-based unsaturated moiety is known as a saturated elastomer block. A case in which the TPE elastomer block contains an ethylene-based unsaturated moiety (that is, a carbon-carbon double bond) is known as an unsaturated or diene elastomer block.

A saturated elastomer block is constituted from a polymer sequence obtained by polymerizing at least 1 (that is, 1 or more) ethylenic monomer, that is, a monomer that contains a carbon-carbon double bond. Examples of blocks obtained from these ethylenic monomers include polyalkylene blocks, such as ethylene/propylene or ethylene/butylene random copolymers. These saturated elastomer blocks may also be obtained by hydrogenating unsaturated elastomer blocks. These saturated elastomer blocks may be aliphatic blocks obtained from polyether, polyester or polycarbonate families.

In the case of a saturated elastomer block, it is preferable for such elastomer blocks in the TPE to be constituted mainly from ethylenic units. Mainly, it should be understood that the maximum content by mass of ethylenic monomers relative to the overall mass of elastomer blocks is preferably greater than 50%, more preferably greater than 75%, and further preferably greater than 85%.

A $C_4$-$C_{14}$ conjugated diene may be copolymerized with the ethylenic monomer. In such cases, the $C_4$-$C_{14}$ conjugated diene is a random copolymer. It is preferable for these conjugated dienes to be selected from among isoprene, butadiene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 1,3-hexadiene, 2-methyl-1,3-hexadiene, 3-methyl-1,3-hexadiene, 4-methyl-1,3-hexadiene, 5-methyl-1,3-hexadiene, 2,3-dimethyl-1,3-hexadiene, 2,4-dimethyl-1,3-hexadiene, 2,5-dimethyl-1,3-hexadiene, 2-neopentylbutadiene, 1,3-cyclopentadiene, 1,3-cyclohexadiene, 1-vinyl-1,3-cyclohexadiene and mixtures thereof. It is more preferable for the conjugated diene to be isoprene or a mixture containing isoprene.

In the case of an unsaturated elastomer block, it is preferable for such elastomer blocks in the TPE to be constituted mainly from diene elastomer portions. Mainly, it should be understood that the maximum content by mass of ethylenic monomers relative to the overall mass of elastomer blocks is preferably greater than 50%, more preferably greater than 75%, and further preferably greater than 85%. Alternatively, unsaturated moieties in unsaturated elastomer blocks may be derived from monomers containing double bonds and cyclic unsaturated moieties, and an example thereof is polynorbornene.

It is preferable for the $C_4$-$C_{14}$ conjugated diene to be polymerized or copolymerized in order to form a diene elastomer block. It is preferable for these conjugated dienes to be selected from among isoprene, butadiene, piperylene, 1-methylbutadiene, 2-methylbutadiene, 2,3-dimethyl-1,3-butadiene, 2,4-dimethyl-1,3-butadiene, 1,3-pentadiene, 2-methyl-1,3-pentadiene, 3-methyl-1,3-pentadiene, 4-methyl-1,3-pentadiene, 2,3-dimethyl-1,3-pentadiene, 2,5-dimethyl-1,3-pentadiene, 2-methyl-1,4-pentadiene, 1,3-hexadiene, 2-methyl-1,3-hexadiene, 2-methyl-1,5-hexadiene, 3-methyl-1,3-hexadiene, 4-methyl-1,3-hexadiene, 5-methyl-1,3-hexadiene, 2,5-dimethyl-1,3-hexadiene, 2,5-dimethyl-2,4-hexadiene, 2-neopentyl-1,3-butadiene, 1,3-cyclopentadiene, methylcyclopentadiene, 2-methyl-1,6-heptadiene, 1,3-cyclohexadiene, 1-vinyl-1,3-cyclohexadiene and mixtures thereof. It is more preferable for the conjugated diene to be isoprene, butadiene or a mixture containing isoprene and/or butadiene.

According to a modification, a monomer that is polymerized in order to form the elastomer portion of the TPE may be randomly copolymerized with at least one other monomer so as to form an elastomer block. According to this modification, the molar proportion of polymerized monomers other than ethylenic monomers relative to the total number of elastomer block units must be such that this block maintains the characteristics of the elastomer. It is preferable for the molar proportion of these other comonomers to be from 0% to 50%, more preferably from 0% to 45%, and further preferably from 0% to 40%.

By way of explanation, these other monomers that can be copolymerized with the first monomer can be selected from among the ethylenic monomers defined above (for example, ethylene) and diene monomers, and more specifically a conjugated diene monomer having from 4 to 14 carbon atoms, as defined above (for example, butadiene), a vinyl aromatic type monomer having from 8 to 20 carbon atoms, as defined above, and a monomer able to include vinyl acetate.

In cases where the comonomer is a vinyl aromatic type, it is advantageous for the content thereof relative to the total number of thermoplastic block units to be from 0% to 50%, preferably from 0% to 45%, and more preferably from 0% to 40%. The styrene-based monomers mentioned above, that is, methylstyrene, para-(tert-butyl)styrene, chlorostyrene, bromostyrene, fluorostyrene and para-hydroxystyrene, are particularly suitable as vinyl aromatic compounds. Styrene is preferred as the vinyl aromatic type comonomer.

The elastomer blocks may be blocks containing several types of ethylenic, diene-based or styrene-based monomers, such as those defined above.

The elastomer blocks may also be constituted from several elastomer blocks, as defined above.

1.2.3. Thermoplastic Block Properties

The glass transition temperature (Tg) characteristics of the rigid thermoplastic resin block are used as a definition of the thermoplastic block. These characteristics are well known by persons skilled in the art. In particular, these enable an industrial treatment (conversion) temperature to be selected. In the case of an amorphous polymer (or polymer block) the treatment temperature may be selected so as to be substantially higher than the Tg value. In the case of a semi-crystalline polymer (or polymer block), a melting point that is higher than the glass transition temperature may be observed. In such cases, the melting point (M.p.) enables a treatment temperature for a problematic polymer (or polymer block) to be selected. Therefore, in cases where the wording "Tg (or M.p. where appropriate)" is mentioned hereinafter, it is essential to regard this as a temperature able to be used in order to select a treatment temperature.

The TPE elastomer required in the present invention preferably has a Tg (or M.p. where appropriate) of 80° C. or higher, and preferably contains 1 or more thermoplastic blocks formed from polymerized monomers. It is preferable for the Tg (or M.p. where appropriate) of the thermoplastic block to be from 80° C. to 250° C. It is preferable for the Tg (or M.p. where appropriate) of the thermoplastic block to be from 80° C. to 200° C., and more preferably from 80° C. to 180° C.

In the TPE defined in order to carry out the present invention, the proportion of thermoplastic blocks is quantitatively determined by thermoplastic characteristics that must be exhibited by the copolymer mentioned above. It is preferable for a thermoplastic block having a Tg (or M.p. where appropriate) of 80° C. or higher to be present at a proportion that is sufficient for maintaining the thermoplastic properties of the elastomer in the present invention. The minimum content in the TPE of a thermoplastic block having a Tg (or M.p. where appropriate) of 80° C. or higher may vary depending on the usage conditions of the copolymer.

Thermoplastic blocks having a Tg (or M.p. where appropriate) of 80° C. or higher may be formed from polymerized monomers having a variety of properties; in particular, these thermoplastic blocks may be constituted from the blocks mentioned below or mixtures thereof:

- polyolefins (polyethylene, polypropylene);
- polyurethanes;
- polyamides;
- polyesters;
- polyacetals;
- polyethers (poly(ethylene oxides), poly(phenylene ethers));
- poly(phenylene sulfides);
- polyfluoro compounds (FEP, PFA, ETFE);
- polystyrene;
- polycarbonates;
- polysulfones;
- poly(methyl methacrylate);
- polyether imides;
- thermoplastic copolymers, such as acrylonitrile/butadiene/styrene (ABS) copolymers. These thermoplastic blocks are preferably constituted from polyurethanes.

Thermoplastic blocks having a Tg (or M.p. where appropriate) of 80° C. or higher may also be obtained from the compounds listed below and mixtures thereof:

- acenaphthylene: a person skilled in the art may refer to, for example, Z. Fodor and J. P. Kennedy, Polymer Bulletin, 1992, 29(6), pages 697-705;
- indene and derivatives thereof, such as 2-methylindene, 3-methylindene, 4-methylindene, dimethylindene, 2-phenylindene, 3-phenylindene and 4-phenylindene; a person skilled in the art may refer to, for example, the specification of U.S. Pat. No. 4,946,899, inventors: Kennedy, Puskas, Kaszas & Hager; J. E. Puskas, G. Kaszas, J. P. Kennedy and W. G Hager, Journal of Polymer Science, Part A, Polymer Chemistry (1992), 30, 41; and J. P. Kennedy, N. Meguriya and B. Keszler, Macromolecules (1991), 24(25), 6572-6577;
- isoprene (in this case, a specific number of trans-1,4-polyisoprene units and cyclized units formed by intramolecular processes); a person skilled in the art may refer to, for example, G. Kaszas, J. E. Puskas and P. Kennedy, Applied Polymer Science (1990), 39(1), pages 119-144; and J. E. Puskas, G. Kaszas and J. P. Kennedy, Macromolecular Science, Chemistry A28 (1991), pages 65-80.

The thermoplastic blocks may be constituted from several thermoplastic blocks, as defined above.

1.2.4. TPE Examples

For example, a TPE which is a copolymer, the elastomer portions of which are saturated, and which contains styrene blocks and alkylene blocks. The alkylene blocks are preferably ethylene, propylene or butylene. More preferably, this TPE elastomer is selected from the group consisting of linear and star-like branched diblock copolymers and triblock copolymers, shown below: styrene/ethylene/butylene (SEB), styrene/ethylene/propylene (SEP), styrene/ethylene/ethylene/propylene (SEEP), styrene/ethylene/butylene/styrene (SEBS), styrene/ethylene/propylene/styrene (SEPS), styrene/ethylene/ethylene/propylene/styrene (SEEPS), styrene/isobutylene (SIB), styrene/isobutylene/styrene (SIBS) copolymers, and mixtures of these copolymers.

According to another example, the TPE is a copolymer, the elastomer portions of which are unsaturated, which contains styrene blocks and diene blocks, and in which these diene blocks are isoprene blocks or butadiene blocks in particular. More preferably, this TPE elastomer is selected from the group consisting of linear and star-like branched diblock copolymers and triblock copolymers, shown below: styrene/butadiene (SB), styrene/isoprene (SI), styrene/butadiene/isoprene (SBI), styrene/butadiene/styrene (SBS), styrene/isoprene/styrene (SIS), styrene/butadiene/isoprene/styrene (SBIS) and styrene/ethylene/butylene/styrene (SEBS) copolymers, and mixtures of these copolymers. A styrene/ethylene/butylene/styrene (SEBS) copolymer is more preferred.

Another example is a TPE which is a linear or star-like branched copolymer, the elastomer portions of which include saturated and unsaturated portions, such as styrene/butadiene/butylene (SBB), styrene/butadiene/butylene/styrene (SBBS) copolymers, or mixtures of these copolymers.

Examples of multiblock TPEs include copolymers containing random copolymer blocks of ethylene and propylene/polypropylene, polybutadiene/polyurethane (TPU), polyether/polyester (COPE) or polyether/polyamide (PEBA). Examples of commercially available TPE elastomers include SEPS, SEEPS and SEBS type elastomers available from Kraton as Kraton G products (for example, G1650, G1651, G1654 and G1730) and from Kuraray as Septon products (for example, Septon 2007, Septon 4033 and Septon 8004), SIS type elastomers available from Kuraray as Hybrar 5125 and from Kraton as D1161, a linear SBS type elastomer available from Polimeri Europa as Europrene SOLT 166, and a star-like branched SBS type elastomer available from Kraton as D1184. Other examples include elastomers available from Dexco Polymers as Vector products (for example, Vector 4114 and Vector 8508). Examples of multiblock TPEs include COPE TPEs such as Vistamaxx TPE, which is available from Exxon; Arnitel, which is available from DSM; Hytrel, which is available from DuPont; Riteflex, which is available from Ticona; PEBA TPEs such as PEBAX, which is available from Arkema; and TPU TPEs such as TPU 7840, which is available from Sartomer and Elastogran, which is available from BASF.

1.2.5. TPE Quantity

In cases where another (non-thermoplastic) elastomer is used in the composition where necessary, 1 or more TPE elastomers account for most of the mass; in such cases, 1 or more TPE elastomers account for at least 65 mass %, preferably at least 70 mass %, and more preferably at least 75 mass %, of all elastomers present in the elastomer composition. It is more preferable for 1 or more TPE elastomers to account for at least 95 mass % (and especially 100%) of all elastomers present in the elastomer composition.

Therefore, the quantity of TPE elastomers falls within the range of from 65 to 100 phr, preferably from 70 to 100 phr, and particularly preferably from 75 to 100 phr. It is more preferable for the composition to contain TPE elastomers at a quantity of from 95 to 100 phr.

The non-woven fabric raw material is preferably a synthetic resin, and more preferably a thermoplastic resin.

2. Additives

The non-woven fabric in the present invention may contain arbitrary additives, such as antioxidants, lubricants, pigments, fillers and crystal nucleating agents, as long as the objective of the present invention is not impaired. The additive content can be, for example, 0.1-50 mass % relative to the overall quantity of fibers in the non-woven fabric raw material. However, it is preferable for the non-woven fabric raw material to contain no additives.

3. Production Method

The non-woven fabric in the present invention can be produced by, for example, an electrospinning method such as that described below. Electrospinning methods are also known as static spinning methods and electrospraying methods, and are methods in which fibers are formed in a process comprising applying a high voltage to a spinning solution and discharging the solution to an earth or a collector having the opposite charge from the spinning solution. Spinning is possible at ordinary temperatures, fibers can be produced relatively easily, and the fiber diameter can be controlled over a broad range. In addition, electrospinning methods have the advantage of being applicable to many types of polymer. The non-woven fabric in the present invention can be produced using a composite melt spinning method or a melt blowing method.

The spinning solution can be produced by adding the non-woven fabric raw material to a solvent and, if necessary, heating and/or stirring. The heating temperature and stirring duration are matters that a person skilled in the art could decide as appropriate. For example, it is advantageous to stir for a period of between 1 hour and 1 week at a temperature of 20-100° C.

The solvent is not particularly limited as long as the non-woven fabric raw material can be dissolved therein, the solvent can be evaporated at the spinning stage, and fibers can be formed. For example, it is possible to use acetone, chloroform, ethanol, 2-propanol, methanol, toluene, tetrahydrofuran, water, benzene, benzyl alcohol, 1,4-dioxane, 1-propanol, dichloromethane, carbon tetrachloride, cyclohexane, cyclohexanone, phenol, pyridine, trichloroethane, acetic acid, formic acid, hexafluoro-2-propanol, hexafluoroacetone, N,N-dimethylformamide (DMF), N,N-dimethylacetamide, acetonitrile, N-methyl-2-pyrrolidinone, N-methyl-morpholine-N-oxide, 1,3-dioxolane, methyl ethyl ketone or a mixture of these solvents. It is possible to use one of these solvents in isolation, or a combination of two or more types thereof. Of these, N,N-dimethylformamide is preferred from the perspective of handleability.

The concentration of the non-woven fabric raw material in the spinning solution is preferably 0.1-50 mass %, and more preferably 5-20 mass %.

The applied voltage is generally 5-50 kV. The discharge pressure is generally 0.001-0.1 MPa. Vacuum drying may be carried out in order to remove the solvent from the obtained non-woven fabric.

4. Physical Properties

The average fiber diameter of fibers that constitute the non-woven fabric or the non-woven fabric laminate in the present invention is less than 3000 nm. A fiber diameter of less than 3000 nm is therefore required in order to increase the pore diameter and tortuosity (this indicates the degree to which an air pathway penetrates relative to the thickness of a sample, and is the ratio of the length of an air pathway relative to the sample thickness), increase the fiber surface area increases and decrease fiber rigidity, thereby causing the fibers to be vibrated by sound waves, increasing energy losses (friction between air and fibers) and effectively increasing the sound absorption rate. For similar reasons, and in order to maintain a stable fiber diameter and a desired fiber rigidity, the fiber diameter is preferably greater than 100 nm and less than 3000 nm, more preferably 300-2000 nm, and further preferably 400-1200 nm. Moreover, in the present specification, the average fiber diameter is the average diameter of 100 or more fibers. In cases where the non-woven fabric is produced using, for example, the electrospinning method mentioned above in "3. Production method", the average fiber diameter can be adjusted by adjusting the spinning conditions (solution discharge pressure, applied voltage, humidity, and the like), the viscosity of the spinning solution, the boiling point or electrical conductivity of the solvent, and the like.

Obtained non-woven fabrics may be laminated to form a laminate. The number of non-woven fabrics laminated should be such that the thickness of the laminated non-woven fabrics is less than 10 mm.

The non-woven fabrics may be pressed before or after lamination. It is preferable for a laminate to be pressed. The pressing can be carried out under conditions of heat and/or pressure using a hot pressing machine. In such cases, the temperature and pressure are matters that a person skilled in the art could specify as appropriate according to the thermal characteristics of the non-woven fabric raw material, and the like.

The thickness after pressing should be less than 10 mm, but is preferably not less than 1 mm and less than 10 mm, more preferably 1.5-7.5 mm, and further preferably 2-5 mm. If the thickness falls within this range, it is possible to reduce thickness while maintaining sound absorption properties.

Flow resistivity is a physical property value that indicates the degree of difficulty for air to flow in a porous material. Flow resistivity is determined by measuring the difference in pressure at 0.5 mm/s in accordance with ISO 9053. The flow resistivity of the non-woven fabric or the non-woven fabric laminate in the present invention is greater than $4.0 \text{ E}+06$ $\text{Ns/m}^4$ and less than $5.0 \text{ E}+08 \text{ Ns/m}^4$. Flow resistivity is caused by friction between air and the fiber surface, and this friction causes loss of energy of sound waves that vibrate the fibers, thereby absorbing the sound waves. The flow resistivity of the non-woven fabric or the non-woven fabric laminate in the present invention must be greater than $4.0 \text{ E}+06 \text{ Ns/m}^4$ in order to increase energy loss of sound waves in the low frequency region, but if this flow resistivity is too great, it is difficult for the sound waves to enter the inner part of the sound absorbing body, and the flow resistivity therefore needs to be less than $5.0 \text{ E}+08 \text{ Ns/m}^4$. For similar reasons, the flow resistivity is more preferably greater than $4.0 \text{ E}+06 \text{ Ns/m}^4$ and less than $1.0 \text{ E}+08 \text{ Ns/m}^4$, further preferably from $7.0 \text{ E}+06$ to $8.0 \text{ E}+07 \text{ Ns/m}^4$, and yet further preferably from $1.0 \text{ E}+07$ to $6.0 \text{ E}+07 \text{ Ns/m}^4$. Moreover, the flow resistivity can be adjusted by adjusting the porosity, fiber diameter, number of fibers per unit volume or tortuosity in the non-woven fabric or the non-woven fabric laminate in the present invention.

The bulk density is greater than 70 kg/m³ and less than 750 kg/m³, regardless of whether or not the non-woven fabric is laminated and regardless of whether or not pressing is carried out. The bulk density is preferably greater than 100 kg/m³ and less than 650 kg/m³, more preferably 130-550 kg/m³, further preferably 150-450 kg/m³, and particularly preferably 200-400 kg/m³. It is preferable for the bulk density to fall within such a range from the perspectives of the relationship with the flow resistivity and exhibiting a satisfactory sound absorption effect in the low frequency region. Moreover, in cases where the non-woven fabric or the non-woven fabric laminate is pressed, the bulk density can be adjusted by adjusting the pressing rate of the non-woven fabric or non-woven fabric in the present invention.

The porosity of the non-woven fabric or non-woven fabric laminate in the present invention is less than 0.92. The porosity is preferably greater than 0.60 and less than 0.92, more preferably greater than 0.65 and less than 0.89, and further preferably 0.70-0.86. It is preferable for the porosity to fall within such a range from the perspectives of the relationship with the flow resistivity and bulk density and exhibiting a satisfactory sound absorption effect in the low frequency region. Moreover, the porosity can be adjusted by adjusting the production conditions, fiber diameter, bulk density, and the like, in the non-woven fabric or the non-woven fabric laminate in the present invention.

The peak of sound absorption of the sound absorbing body of the present invention is preferably less than 3000 Hz in order to achieve a sufficient sound absorption effect in the low frequency region.

The normal incident sound absorption coefficient of the sound absorbing body of the present invention is preferably at least 0.2. The normal incident sound absorption coefficient is more preferably 0.5 or higher.

The vibration space is a physical property value that indicates the thickness of an air layer provided between a non-woven fabric or a non-woven fabric laminate and a supporting surface (the distance between the non-woven fabric or the non-woven fabric laminate and the supporting surface) when the non-woven fabric or the non-woven fabric laminate in the present invention is attached to the supporting surface. A preferred embodiment of the present invention is the sound absorbing body of the present invention in which no vibration space is present. By having no vibration space, the sound absorbing body is compact and useful. Another preferred embodiment of the present invention is the sound absorbing body of the present invention in which a vibration space is provided. By providing a vibration space, it is possible to effectively achieve a satisfactory sound absorbing in the low frequency region.

5. Intended Uses

The sound absorbing body of the present invention can be used in construction materials (for homes, factories and acoustic facilities, for example), motor vehicles, tires, electrical products, and the like.

EXAMPLES

1. Production of Sound Absorbing Body Sample

A spinning solution was prepared by adding PAN (Mw=150,000 g/mol, manufactured by Sigma-Aldrich) at an arbitrary concentration to N,N-dimethylformamide (DMF) (manufactured by Kanto Chemical Co., Inc.), and stirring for 12 hours or longer at 70° C. The solution concentration was 12 mass % for samples having average fiber diameters of 600 nm (Reference Examples 1, 2, 3 and 5) and 15 mass % for a sample having an average fiber diameter of 1100 nm (Example 4).

The obtained spinning solution was placed in an electrospinning apparatus, and a non-woven fabric was obtained by carrying out electrospinning at a discharge pressure of 0.003 MPa and an applied voltage of 20-25 kV. Moreover, the electrospinning was carried out at a temperature of 20-30° C. and a humidity of 20-40%. The obtained non-woven fabric was vacuum dried for 24 hours in order to remove solvent. Measurements were carried out on a sample obtained by laminating thus obtained non-woven fabrics so as to obtain a laminate and then pressing the laminate.

The pressing treatment was carried out using a spacer on a table top type hot press at room temperature and a pressure of 20 kPa. Moreover, samples (Examples 1-5) were obtained by overlaying 2, 5 or 10 non-woven fabrics having a thickness of 3 mm and pressing at a pressing rate of 3 times or 6 times. Moreover, the reference examples were not pressed. In addition, the thickness of each sample before and after pressing was measured using vernier calipers.

2. Measurements (1) Fiber Diameter

The diameters of 100 or more fibers per sample were measured using a scanning electron microscope (SS-550, manufactured by Shimadzu Corporation), and the average fiber diameter and fiber diameter distribution were obtained from the SEM images using Image J image analysis software (produced by the National Institutes of Health).

(2) Flow Resistivity

Flow resistivity was determined in accordance with ISO 9053: 1991, using a measurement system manufactured by Nihon Onkyo Engineering Co., Ltd.

(3) Bulk Density

Bulk density was determined by cutting a sample into a measurable shape (a circular cylinder or cuboid), measuring the dimensions of the cut sample, measuring the weight of the cut sample using an electronic balance, and dividing the weight by the volume.

(4) True Density

True density was determined by measuring the weight of a sample in air and in water (Mair, Mwater) and using the following equation on the basis of Archimedes' principle.

$$(\text{True density}) = M\text{air}/(M\text{air} - M\text{water}) \times (\rho 0 - d) + d$$

Here, ρ0 denotes the density of water and d denotes the density of air.

(5) Porosity

The porosity was calculated using the equation below from the bulk density (ρbulk) and true density (ρtrue), which were determined as explained above.

$$(\text{Porosity}) = 1 - \rho\text{bulk}/\rho\text{true}$$

(6) Normal Incident Sound Absorption Coefficient and Peak of Sound Absorption

Normal incident sound absorption coefficient and peak of sound absorption were calculated in accordance with the transfer function method specified in ISO 10534-2 using an acoustic impedance tube (Bruel & Kjaer 4206 model). A sample was fixed to the back wall using double-sided tape, without a vibration space.

3. Results

The measurement results are shown in Table 1.

TABLE 1

|  | Reference | Example 1 | Example 2 | Example 3 | Example 4 | Example 5 |
|---|---|---|---|---|---|---|
| Press (times) | — | 3 | 6 | 3 | 3 | 6 |
| Thickness after press (mm) | 5 | 5 | 5 | 2 | 2 | 1 |
| Material | PAN | PAN | PAN | PAN | PAN | PAN |
| Fiber diameter (mm) | 600 | 600 | 600 | 600 | 1100 | 600 |
| Flow resistibility (Ns/m$^4$) | 2.7E+06 | 1.6E+07 | 5.3E+07 | 1.6E+07 | 1.7E+07 | 5.3E+07 |
| Porosity | 0.962 | 0.827 | 0.713 | 0.827 | 0.85 | 0.713 |
| Bulk density(kg/m$^3$) | 49 | 225 | 373 | 225 | 201 | 373 |
| True density(kg/m$^3$) | 1289 | 1302 | 1299 | 1302 | 1340 | 1299 |
| Peak of sound absorption (Hz) | 3198 | 1334 | 1044 | 2645 | 2390 | 3113 |
| Sound absorption coefficient | 0.98 | 1.00 | 0.64 | 0.74 | 0.86 | 0.74 |

The invention claimed is:

1. A sound absorbing body comprising a non-woven fabric or a non-woven fabric laminate,
   wherein the non-woven fabric or the non-woven fabric laminate comprises a fiber that has an average fiber diameter of less than 3,000 nm,
   wherein the non-woven fabric or the non-woven fabric laminate has a thickness of less than 10 mm,
   wherein the non-woven fabric or the non-woven fabric laminate has a unit thickness flow resistance of greater than 4.0 E+06 Ns/m$^4$ and less than 5.0 E+08 Ns/m$^4$,
   wherein the non-woven fabric or the non-woven fabric laminate has a bulk density of greater than 70 kg/m$^3$ and less than 750 kg/m$^3$, and
   wherein the non-woven fabric or the non-woven fabric laminate has a porosity of lower than 0.92.

2. The sound absorbing body according to claim 1, wherein the non-woven fabric or the non-woven fabric laminate comprises a fiber formed from a synthetic resin, an elastomer, or a combination of a synthetic resin and an elastomer.

3. The sound absorbing body according to claim 2, wherein the synthetic resin is a thermoplastic resin.

4. The sound absorbing body according to claim 3, wherein the thermoplastic resin is selected from the group consisting of polyethylene, polypropylene, polyacrylonitrile, poly(vinylidene fluoride), polysulfone, polyether sulfone, polyether ketone, polyether ether ketone, polyamide, polyester, polycarbonate, polyether imide, poly(arylene oxide), thermoplastic polyimide, polyamideimide, poly(butylene terephthalate), poly(ethylene terephthalate), polyethylene, acrylonitrile-butadiene-styrene and polyurethane resins.

5. The sound absorbing body according to claim 2, wherein the elastomer is a thermoplastic elastomer.

6. The sound absorbing body according to claim 5, wherein the thermoplastic elastomer is a thermoplastic styrene (TPS) elastomer.

7. The sound absorbing body according to claim 6, wherein the thermoplastic styrene elastomer is a block copolymer selected from the group consisting of styrene/butadiene/styrene (SBS), styrene/butadiene/butylene/styrene (SBBS), styrene/isoprene/styrene (SIS), styrene/butadiene/isoprene/styrene (SBIS), styrene/ethylene/butylene/styrene (SEBS) and the mixtures thereof.

8. The sound absorbing body according to claim 7, wherein the thermoplastic styrene elastomer is a styrene/ethylene/butylene/styrene (SEBS) copolymer.

9. The sound absorbing body according to claim 1, wherein the sound absorbing body exhibits a peak of sound absorption of lower than 3,000 Hz.

10. The sound absorbing body according to claim 1, wherein the sound absorbing body exhibits a normal incident sound absorption coefficient of 0.2 or higher.

* * * * *